US012763941B1

(12) United States Patent
Nelson et al.

(10) Patent No.: US 12,763,941 B1
(45) Date of Patent: Oct. 13, 2026

(54) SYSTEM, METHOD, AND APPARATUS FOR UTILIZING A HADAMARD GATE FOR GENERATING SEED SEQUENCES FOR AN ENCRYPTION ENGINE

(71) Applicant: ElysiumQ, Inc., Lehi, UT (US)

(72) Inventors: Tucker Nelson, Shell, WY (US); Tre' Nelson, Shell, WY (US); Bret Winkler, Sandy, UT (US)

(73) Assignee: ElysiumQ, Inc., Lehi, UT (US)

( * ) Notice: Subject to any disclaimer, the term of this patent is extended or adjusted under 35 U.S.C. 154(b) by 86 days.

(21) Appl. No.: 18/901,355

(22) Filed: Sep. 30, 2024

(51) Int. Cl.
*H04L 9/08* (2006.01)
*G06F 7/58* (2006.01)

(52) U.S. Cl.
CPC ............ *H04L 9/0869* (2013.01); *G06F 7/588* (2013.01); *H04L 9/0852* (2013.01)

(58) Field of Classification Search
None
See application file for complete search history.

(56) References Cited

U.S. PATENT DOCUMENTS

2023/0196155 A1* 6/2023 Maslov .................... G06F 21/14 706/62
2023/0353348 A1* 11/2023 Ganguly ............... H04L 9/0855
2025/0131308 A1* 4/2025 Heimonen ............. G06N 10/40

* cited by examiner

*Primary Examiner* — Nelson S. Giddins
(74) *Attorney, Agent, or Firm* — Esplin & Associates, PC

(57) ABSTRACT

A system and method for utilizing a Hadamard gate for generating seed sequences for an encryption engine are disclosed. Exemplary implementations may include: store a Hadamard gate and a first logic circuit; receive a first bit sequence; generate a second bit sequence based on the first bit sequence by, for individual bits of the first bit sequence, provide the individual bit of the first bit sequence as input to the Hadamard gate to generate a first transformed bit, and the first transformed bit and one or more bits of the first bit sequence as input to the first logic circuit to produce a first bit output, the second bit sequence including the first bit output; generate a seed sequence based on the second bit sequence; use the seed sequence as a seed to the encryption engine; and/or other exemplary implementations.

20 Claims, 4 Drawing Sheets

SYSTEM, METHOD, AND APPARATUS FOR UTILIZING A HADAMARD GATE FOR GENERATING SEED SEQUENCES FOR AN ENCRYPTION ENGINE

FIELD OF THE DISCLOSURE

The field of the present disclosure is random number generation, and more particularly to the implementation of simulated quantum mechanics to enhance randomness of generated numbers.

BACKGROUND

Quantum random number generators (QRNGs) that harness the unpredictability of quantum events to generate truly random numbers are known. Programmable quantum simulators are known.

SUMMARY

The following disclosure provides a quantum pseudo number generator designed to simulate quantum mechanics, specifically leveraging the probabilistic nature of quantum state collapses and entanglement phenomena (e.g., through the use of a Hadamard gate), to enhance the unpredictability and security of the outputs. By simulating quantum mechanics, the present system is able to achieve randomness levels akin to that achieved by hardware quantum devices using commercially available computers. The system incorporates quantum gates, specifically a Hadamard gate, to simulate a level of randomness that is rooted in the principles of quantum physics.

One or more aspects of the present disclosure include a system for utilizing a Hadamard gate for generating seed sequences for an encryption engine. The system may include one or more hardware processors configured by machine-readable instructions, electronic storage, and/or other components. Executing the machine-readable instructions may cause the one or more hardware processors to utilize a Hadamard gate for generating seed sequences for an encryption engine. The machine-readable instructions may include one or more computer program components. The one or more computer program components may include one or more of an input component, a circuit component, a seed component, and/or other components.

The electronic storage may store a Hadamard gate and a first logic circuit. The first logic circuit may be configured to apply one or more logic operations on one or more inputs to the first logic circuit to produce one or more output bits.

The input component may be configured to receive a first bit sequence and/or other sequences.

The circuit component may be configured to generate a second bit sequence based on the first bit sequence. The circuit component may be configured to, for individual bits of the first bit sequence, provide the individual bit of the first bit sequence as input to the Hadamard gate. The Hadamard gate may generate a first transformed bit based on the provided input. The circuit component may be configured to provide the first transformed bit and one or more bits of the first bit sequence as input to the first logic circuit to produce a first bit output. The one or more other bits of the first bit sequence may be determined based on an index of the individual bit of the first bit sequence. The second bit sequence may include the first bit output.

The circuit component may be configured to generate a seed sequence based on the second bit sequence.

The seed component may be configured to use the seed sequence as a seed to the encryption engine.

As used herein, any association (or relation, or reflection, or indication, or correspondency) involving servers, processors, client computing platforms, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

These and other features, and characteristics of the present technology, as well as the methods of operation and functions of the related elements of structure and the combination of parts will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of 'a,' 'an,' and 'the' include plural referents unless the context clearly dictates otherwise.

DETAILED DESCRIPTION

Figure 1:
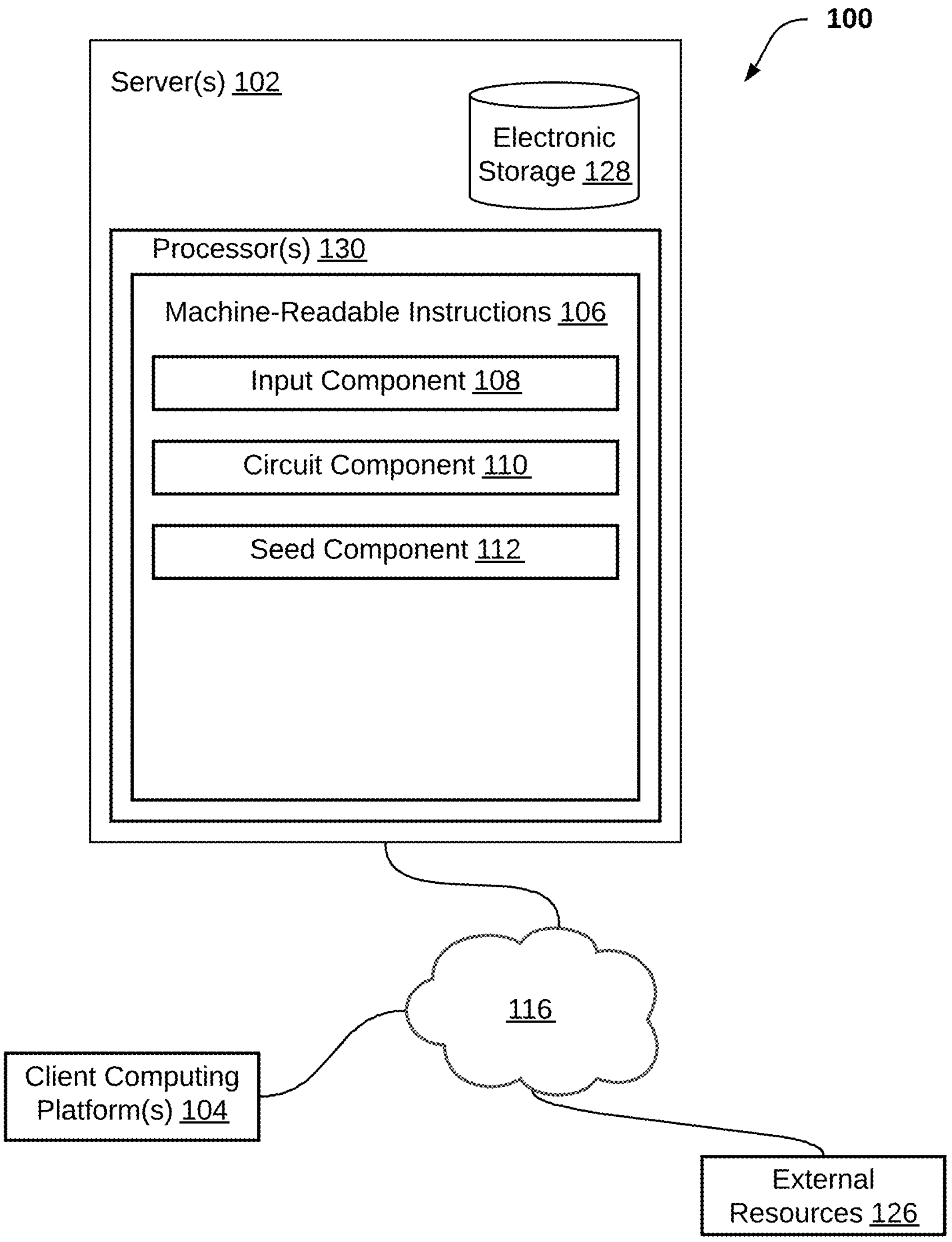
FIG. 1 illustrates a system for utilizing a Hadamard gate for generating seed sequences for an encryption engine, in accordance with one or more implementations.

FIG. 1 illustrates a system 100 configured to utilize a Hadamard gate for generating seed sequences for an encryption engine, in accordance with one or more implementations. In some implementations, system 100 may include one or more servers 102. Server(s) 102 may include electronic storage 128, one or more processors 130, and/or other components. Server(s) 102 may be configured to communicate with one or more client computing platforms 104 according to a client/server architecture and/or other architectures. Client computing platform(s) 104 may be configured to communicate with other client computing platforms via server(s) 102 and/or according to a peer-to-peer architecture and/or other architectures. Users may access system 100 via client computing platform(s) 104.

Server(s) 102 may be configured by machine-readable instructions 106. Machine-readable instructions 106 may include one or more instruction components. The instruction components may include computer program components. The instruction components may include one or more of input component 108, circuit component 110, seed component 112, and/or other instruction components.

Electronic storage 128 may store a plurality of quantum gates and/or other types of gates, including a Hadamard gate. The stored Hadamard gate may be defined by the following matrix:

$$H = \frac{1}{\sqrt{2}}\begin{bmatrix} 1 & 1 \\ 1 & -1 \end{bmatrix}$$

The matrix may be applied to a single qubit such that the resulting qubit exists in equal superposition of the two basis states. The superposition affected by application of the matrix defining the Hadamard gate may enable simultaneous exploration of multiple computational paths. Electronic storage 128 may store a first logic circuit, and/or other logic circuits. The first logic circuit may be configured to apply one or more logic operations on one or more inputs to the first logic circuit to produce one or more output bits. In some implementations, the first logic circuit may be a multi-input logic circuit configured to receive a plurality of input bits. In some implementations, electronic storage 128 may be configured to store a quantum logic circuit comprising the Hadamard gate, the first logic circuit, and/or other logic operations. The quantum logic circuit may be a multi-input logic circuit defined as:

$$(Hb_x\ XNOR\ b_{n-x})\ XNOR\ (Hb_x\ XNOR\ b_{x+1})$$

where $b_x$ is a an individual bit of a bit sequence of length n, $b_{x+1}$ and bn-x are bits of the same bit sequence, and $Hb_x$ is the output of the Hadamard gate based on $b_x$ input. The quantum logic circuit is exemplary and not intended to be limiting. By way of non-limiting illustration, one or more other logic operations may be applied between the output of the Hadamard gate based on $b_x$ input and one or more other bits of the same bit sequence. In some implementations, one or more of the plurality of quantum gates stored in electronic storage 128 may be utilized in place of and/or in addition to the Hadamard gate.

Input component 108 may be configured to receive a first bit sequence and/or other sequences. The first bit sequence may have a length of 32 bits, 64 bits, 128 bits, 256 bits, 512 bits, and/or other lengths. The first bit sequence may be defined by an order of bits. Individual bits of the order of bits may encode one of two discrete states, denoted as ‘0’ and ‘1.’ The first bit sequence may be inputted by a user (via a client computing platform 104 associated with the user), obtained from a separate pseudorandom number generator (PRNG), obtained from external resources 126 (via network(s) 116), and/or other sources. In some implementations, the first bit sequence may be a seed sequence previously generated by system 100.

Circuit component 110 may be configured to generate a second bit sequence based on one or more of the first bit sequence and/or other bit sequences. Circuit component 110 may be configured to, for individual bits of the first bit sequence, provide the individual bit of the first bit sequence as input to the Hadamard gate. The Hadamard gate may generate a first transformed bit based on the provided input (i.e., the individual bit of the first bit sequence). Generating the first transformed bit may include apply the matrix defining the Hadamard gate to the individual bit of the first bit sequence. Application of the matrix to the individual bits of the first bit sequence may convert the classical discrete states into quantum superpositions, such that the individual bits of the second bit sequence may be placed in superposition.

Circuit component 110 may be configured to provide the first transformed bit and one or more other bits of the first bit sequence as input to the first logic circuit to produce a first bit output. The one or more other bits of the first bit sequence may be determined based on an index of the individual bit of the first bit sequence. The second bit sequence may include the first bit output. The second bit sequence may be generated by aggregating the first bit outputs generated by iterating through the individual bits of the first bit sequence using the stored quantum logic circuit. As such, the second bit sequence may be the same length as the first bit sequence, may be twice the length of the first bit sequence, or may be of other varying lengths.

In some implementations, the one or more bits of the first bit sequence provided as input to the first logic circuit may include a first bit, a second bit, and/or other bits of the first bit sequence. By way of non-limiting illustration, an index of the first bit sequence may be the length of the first bit sequence minus the index of the individual bit of the first bit sequence. An index of the second bit may be the index of the individual bit of the first bit sequence plus one and/or other integers. The first logic circuit may comprise a logic XNOR operation and/or other logical operations between the transformed bit and the first bit to produce a first circuit output, a logic XNOR operation and/or other logic operations between the first transformed bit and the second bit to produce a second circuit output, a logic XNOR operation and/or other logic operations between the first circuit output and the second circuit output to produce the first bit output, and/or other logic operations.

Circuit component 110 may be configured to generate a seed sequence based on the second bit sequence and/or other sequences. In some implementations, generating the seed sequence may include generating a third bit sequence, a fourth bit sequence, a fifth bit sequence, a sixth bit sequence, a seventh bit sequence, eighth bit sequence, and/or other sequences. Circuit component 110 may be configured to generate the third bit sequence by concatenating the first bit sequence, the second bit sequence, and/or other sequences. In some implementations, the order of bits of the first bit sequence and/or the second bit sequence may be reversed prior to concatenation to generate the third bit sequence.

Circuit component 110 may be configured to generate the fourth bit sequence based on the third bit sequence. By way of non-limiting illustration, circuit component 110 may be configured to, for individual bits of the third bit sequence, provide the individual bit of the third bit sequence as input to the Hadamard gate. The Hadamard gate may be configured to generate a second transformed bit based on the provided input (i.e., the individual bit of the third bit sequence). Circuit component 110 may then be configured to provide the second transformed bit and one or more other bits of the third bit sequence as input to the first logic circuit to produce a second bit output. The one or more other bits of the third bit sequence may be determined based on an index of the individual bit of the third bit sequence. The fourth bit sequence may include the second bit output. The fourth bit sequence may be generated by aggregating the second bit outputs generated by iterating through the individual bits of the third bit sequence using the stored quantum logic circuit. As such, the fourth bit sequence may be the same length as the third bit sequence, may be twice the length of the third bit sequence, and/or may be of other varying lengths.

In some implementations, circuit component 110 may be configured to apply a logic XNOR operation and/or other logic operations between the third bit sequence and the fourth bit sequence to generate a fifth bit sequence. In some implementations, circuit component 110 may be configured to generate a sixth bit sequence based on the third bit sequence and/or other sequences. By way of non-limiting illustration, circuit component 110 may be configured to, for individual bits of the third bit sequence, provide the individual bit of the third bit sequence and one or more other bits of the third bit sequence as input to the first logic circuit to produce a third bit output. The one or more other bits of the third bit sequence may be determined based on the index of the individual bit of the third bit sequence. The sixth bit sequence includes the third bit output. The sixth bit sequence may be generated by aggregating the third bit outputs generated by iterating through the individual bits of the third bit sequence using the first logic circuit. As such, the sixth bit sequence may be the same length as the third bit sequence, may be twice the length of the third bit sequence, and/or may be of other varying lengths.

In some implementations, circuit component 110 may be configured to apply a logic XNOR operation and/or other logic operations between the third bit sequence and the sixth bit sequence to generate the seventh bit sequence. Circuit component 110 may be configured to apply a logic XNOR operation and/or other logic operations between the fifth bit sequence and the seventh bit sequence to generate the eighth bit sequence. In some implementations, the seed sequence may be derived from the eighth bit sequence, and/or other sequences. The seed sequence may be the same length as the eighth sequence, twice the length of the eighth sequence, half the length of the eighth bit sequence, and/or other varying lengths. In some implementations, the seed sequence may be generated by reversing the order of bits in the eighth sequence.

Seed component 112 may be configured to use the seed sequence as a seed to an encryption engine. By way of non-limiting illustration, the seed sequence may be employed as a cryptographic key for encryption and decryption. In particular, the seed generated by system 100 may be more unpredictable compared to typical deterministic random bit generators. This may be particularly beneficial to hardware security modules (HSMs), end-user devices, and/or other devices. In some implementations, the seed may be used to generated public/private key pairs for varying contexts. For example, the public/private keys may be used within public key infrastructure (PKI) and Internet of Things (IoT) environments. In some implementations, the seed sequence may be provided to scientific simulations (e.g., Monte Carlo simulations) configured to model complex systems. In some implementations, the seed sequence may be provided for use within gaming and/or gambling contexts. For example, seeds may be used to ensure that outcomes are genuinely random and tamper-resistant, thereby increasing the standard for fairness within the industries.

Figure 3:
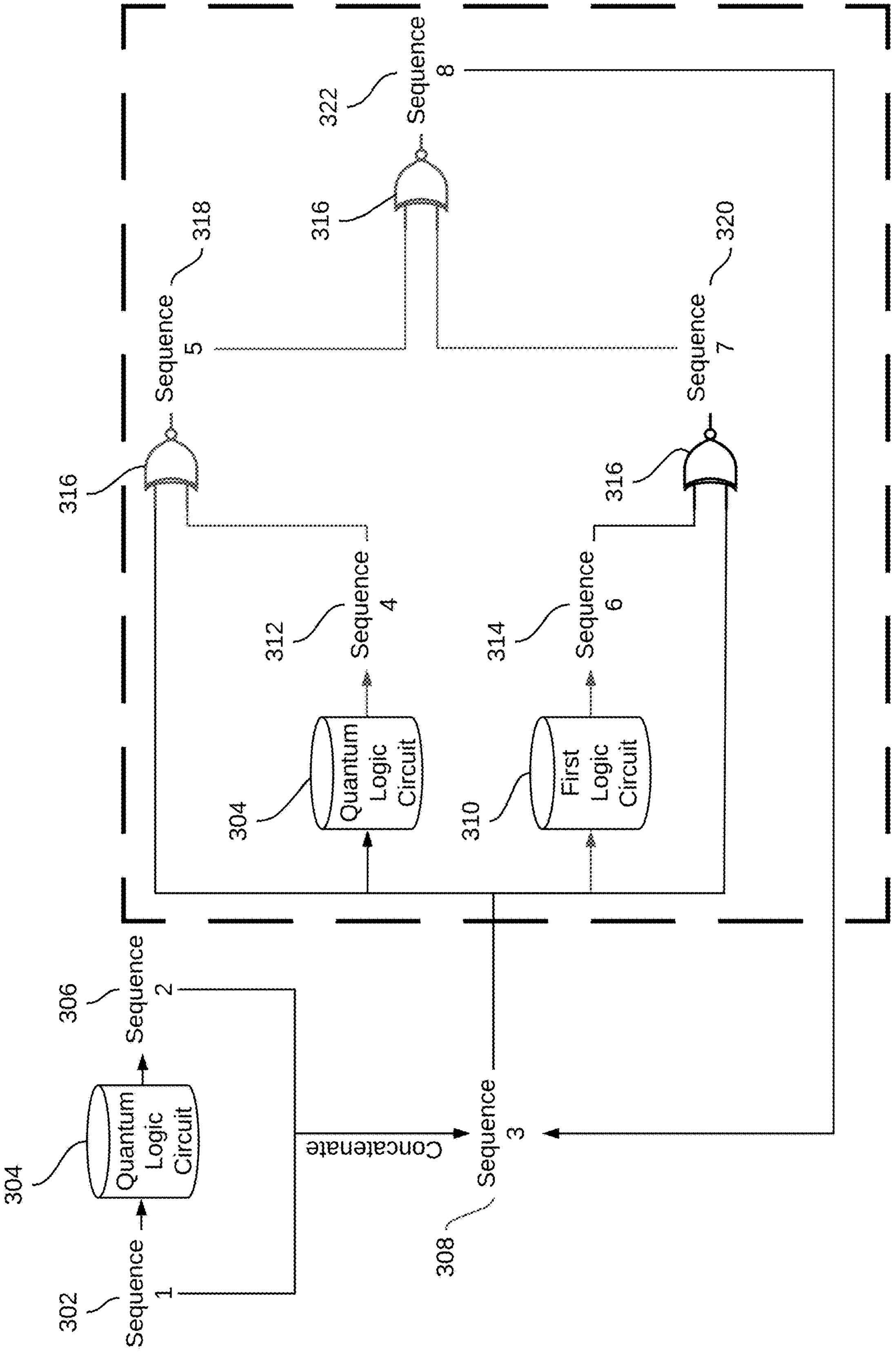
FIG. 3 illustrates an exemplary implementation of a system for utilizing a Hadamard gate for generating seed sequences for an encryption engine, in accordance with one or more implementations.

FIG. 3 illustrates an exemplary implementation of a system for utilizing a Hadamard gate for generating seed sequences for an encryption engine, in accordance with one or more implementations. A first bit sequence 302 may be provided as input to a quantum logic circuit 304. The quantum logic circuit 304 may be similar to or the same as the quantum logic circuit stored in electronic storage 128. The quantum logic circuit 304 may generate a second bit sequence 306 based on first bit sequence 302. The first bit sequence 302 and the second bit sequence 306 may be concatenated to generate a third bit sequence 308. The third bit sequence 308 may be provided as input to the quantum logic circuit 304. The quantum logic circuit 304 may generate a fourth bit sequence 312 based on the third bit sequence 308. The third bit sequence 308 and the fourth bit sequence 312 may be provided as inputs to an XNOR logic gate 316 to generate a fifth sequence 318. The third bit sequence 308 may be provided as input to a first logic circuit 310. In some implementations, the first logic circuit 310 may be similar to or the same as the first logic circuit stored in electronic storage 128. The first logic circuit 310 may output a sixth bit sequence 314 based on the third bit sequence 308. The third bit sequence 308 and the sixth bit sequence 314 may be provided as inputs to the XNOR logic gate 316 to generate a seventh bit sequence 320. The fifth bit sequence 318 and the seventh bit sequence 320 may be provided as inputs to the XNOR logic gate 316 to generate an eighth bit sequence 322.

In some implementations, the eighth bit sequence 322 may be used to generate a seed sequence to be provided to an encryption engine. In some implementations, the eighth bit sequence 322 may be substituted for the third bit sequence 308 and the operations indicated by the dashed square may be iterated a number of times before the eighth bit sequence 322 may be used to generate a seed sequence. By way of non-limiting illustration, the operations indicated by the dashed sequence may be repeated once, 5 times, 10 times, and/or other numbers of times prior to the eighth sequence 322 is used to generate the seed sequence. Each iteration of the operations indicated by the dashed square may increase complexity and enhance the randomness of the output (i.e., the seed sequence).

Figure 4:
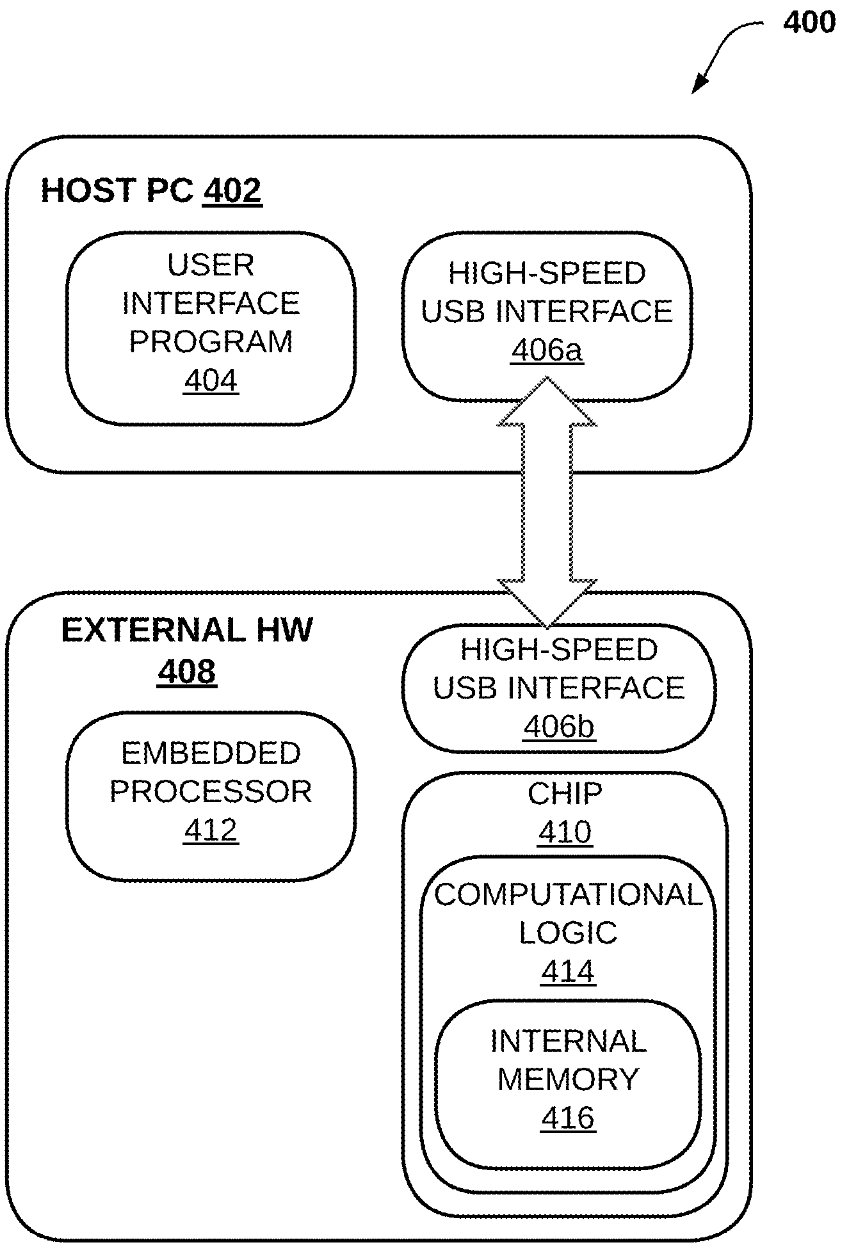
FIG. 4 illustrates a chip-based system for utilizing a Hadamard gate for generating seed sequences, in accordance with one or more implementations.

FIG. 4 illustrates an exemplary architecture of a chip-based system 400 for utilizing a Hadamard gate for generating seed sequences. The chip-based system 400 may include a host computer 402, external hardware 408, and/or other components. Host computer 402 may include a user interface program 404, a high-speed USB interface 406*a*, and/or other components. External hardware 408 may include an embedded processors 412, a programmable chip 410, and high-speed USB interface 406*b*, and/or other components. High-speed USB interface 406*a* of host computer 402 may be configured to communicate with high-speed USB interface 406*b* of external hardware 408. Programmable chip 410 may be a field programable gate array (FPGA), application-specific integrated circuit (ASIC), complex programmable logic device (CPLD), and/or other types of integrated circuits. Programmable chip 410 may comprise computational logic 414 that communicates to and has direct access to internal memory 416. Programmable chip 410 may be programed such that computational logic 414 includes a Hadamard gate configured to receive an input signal and output a transformed signal. Internal memory 416 may include a first register configured to store the transformed signal. Programmable chip 410 may be programed such that computational logic 414 includes a multi-input logic circuit configured to receive a plurality of input signals and output an output signal. The plurality of input signals may include the transformed signal stored in the first register. Internal memory 416 may include a second register configured to store the output signal.

In some implementations, the multi-input logic circuit may include a first XNOR logic gate, a second XNOR logic gate, a third XNOR logic gate, and/or other logic gates. The first XNOR logic gate may be configured to receive the transformed signal and a first input signal and output a first circuit signal. The second XNOR logic gate may be configured to receive the transformed signal and a second input signal and output a second circuit signal. The third XNOR logic gate may be configured to receive the first circuit signal and the second circuit signal as input and output a final circuit signal. The second register of internal memory 416 may be configured to store the final circuit signal.

In some implementations, server(s) 102, client computing platform(s) 104, and/or external resources 126 may be operatively linked via one or more electronic communication links. For example, such electronic communication links may be established, at least in part, via a network 116 such as the Internet and/or other networks. It will be appreciated that this is not intended to be limiting, and that the scope of this disclosure includes implementations in which server(s) 102, client computing platform(s) 104, and/or external resources 126 may be operatively linked via some other communication media.

A given client computing platform 104 may include one or more processors configured to execute computer program components. The computer program components may be configured to enable an expert or user associated with the given client computing platform 104 to interface with system 100 and/or external resources 126 and/or provide other functionality attributed herein to client computing platform(s) 104. By way of non-limiting example, the given client computing platform 104 may include one or more of a desktop computer, a laptop computer, a handheld computer, a tablet computing platform, a Smartphone, and/or other computing platforms.

External resources 126 may include sources of information outside of system 100, external entities participating with system 100, and/or other resources. In some implementations, some or all of the functionality attributed herein to external resources 126 may be provided by resources included in system 100.

Server(s) 102 may include communication lines, or ports to enable the exchange of information with a network 116 and/or other computing platforms. Illustration of server(s) 102 in FIG. 1 is not intended to be limiting. Server(s) 102 may include a plurality of hardware, software, and/or firmware components operating together to provide the functionality attributed herein to server(s) 102. For example, server(s) 102 may be implemented by a cloud of computing platforms operating together as server(s) 102.

Electronic storage 128 may comprise non-transitory storage media that electronically stores information. The electronic storage media of electronic storage 128 may include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 128 may include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 128 may include one or more virtual storage resources (e.g., cloud storage, a virtual private network, and/or other virtual storage resources). Electronic storage 128 may store software algorithms, information determined by processor(s) 130, information received from server(s) 102, information received from client computing platform(s) 104, and/or other information that enables server(s) 102 to function as described herein.

Processor(s) 130 may be configured to provide information processing capabilities in server(s) 102. As such, processor(s) 130 may include one or more of a digital processor, an analog processor, a digital circuit designed to process information, an analog circuit designed to process information, a state machine, and/or other mechanisms for electronically processing information. Although processor(s) 130 is shown in FIG. 1 as a single entity, this is for illustrative purposes only. In some implementations, processor(s) 130 may include a plurality of processing units. These processing units may be physically located within the same device, or processor(s) 130 may represent processing functionality of a plurality of devices operating in coordination. Processor(s) 130 may be configured to execute components 108, 110, 112, and/or other components. Processor(s) 130 may be configured to execute components 108, 110, 112, and/or other components by software; hardware; firmware; some combination of software, hardware, and/or firmware; and/or other mechanisms for configuring processing capabilities on processor(s) 130. As used herein, the term "component" may refer to any component or set of components that perform the functionality attributed to the component. This may include one or more physical processors during execution of processor readable instructions, the processor readable instructions, circuitry, hardware, storage media, or any other components.

It should be appreciated that although components 108, 110, and/or 112 are illustrated in FIG. 1 as being implemented within a single processing unit, in implementations in which processor(s) 130 includes multiple processing units, one or more of components 108, 110, and/or 112 may be implemented remotely from the other components. The description of the functionality provided by the different components 108, 110, and/or 112 described below is for illustrative purposes, and is not intended to be limiting, as any of components 108, 110, and/or 112 may provide more or less functionality than is described. For example, one or more of components 108, 110, and/or 112 may be eliminated, and some or all of its functionality may be provided by other ones of components 108, 110, and/or 112. As another example, processor(s) 130 may be configured to execute one or more additional components that may perform some or all of the functionality attributed below to one of components 108, 110, and/or 112.

Figure 2:
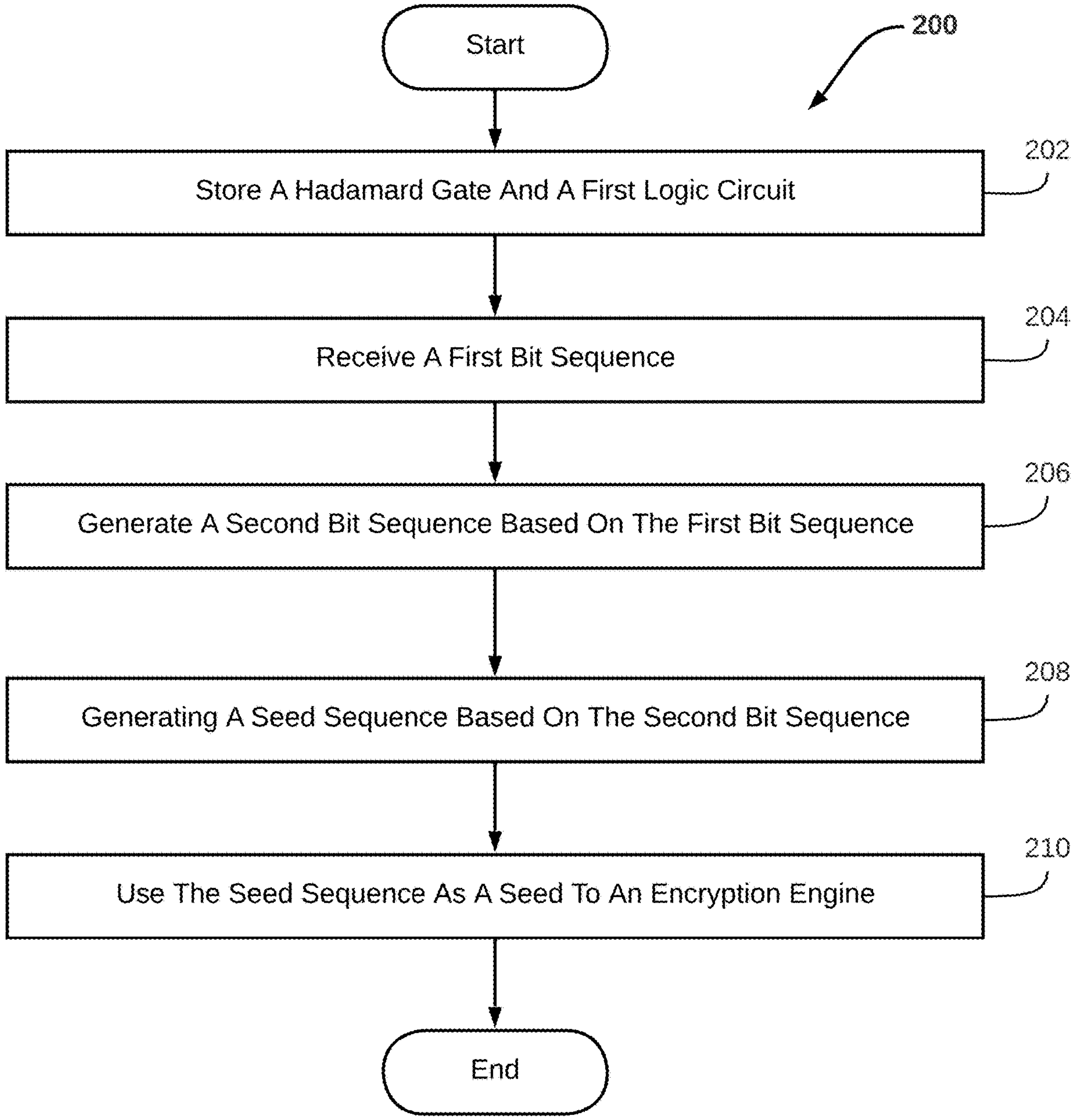
FIG. 2 illustrates a method for utilizing a Hadamard gate for generating seed sequences for an encryption engine, in accordance with one or more implementations.

FIG. 2 illustrates a method 200 for utilizing a Hadamard gate for generating seed sequences for an encryption engine, in accordance with one or more implementations. The operations of method 200 presented below are intended to be illustrative. In some implementations, method 200 may be accomplished with one or more additional operations not described, and/or without one or more of the operations discussed. Additionally, the order in which the operations of method 200 are illustrated in FIG. 2 and described below is not intended to be limiting.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on an electronic storage medium. The one or more processing devices may include one or more devices configured through hardware, firmware, and/or software to be specifically designed for execution of one or more of the operations of method 200.

An operation 202 may include storing a Hadamard gate and a first logic circuit. The first logic circuit may be configured to apply one or more logic operations on one or more inputs to the first logic circuit to produce one or more output bits. Operation 202 may be performed by one or more hardware processors configured by machine-readable instructions including a component that is the same as or similar to electronic storage 128, in accordance with one or more implementations.

An operation 204 may include receiving a first bit sequence and/or other sequences. Operation 204 may be performed by one or more hardware processors configured by machine-readable instructions including a component that is the same as or similar to input component 108, in accordance with one or more implementations.

An operation 206 may include generating a second bit sequence based on the first bit sequence. Generating the second bit sequence may include, for individual bits of the first bit sequence, providing the individual bit of the first bit sequence as input to the Hadamard gate to obtain a first transformed bit. Generating the second bit sequence may include providing the transformed bit and one or more bits of the first bit sequence as input to the first logic circuit to produce a first bit output. The one or more other bits of the first bit sequence may be determined based on an index of the individual bit of the first bit sequence. The second bit sequence may include the first bit output. Operation 206 may be performed by one or more hardware processors configured by machine-readable instructions including a component that is the same as or similar to circuit component 110, in accordance with one or more implementations.

An operation 208 may include generating a seed sequence based on the second bit sequence. Operation 208 may be performed by one or more hardware processors configured by machine-readable instructions including a component that is the same as or similar to circuit component 110, in accordance with one or more implementations.

An operation 210 may include using the seed sequence as a seed to the encryption engine. Operation 210 may be performed by one or more hardware processors configured by machine-readable instructions including a component that is the same as or similar to seed component 112, in accordance with one or more implementations.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed:

1. A system configured to utilize a Hadamard gate for generating seed sequences for an encryption engine, the system comprising:

electronic storage to store a Hadamard gate and a first logic circuit, wherein the first logic circuit is configured to apply one or more logic operations on one or more inputs to the first logic circuit to produce bit outputs;

one or more processors configured by machine-readable instructions to:

receive a first bit sequence;

generate a second bit sequence based on the first bit sequence by, for individual bits of the first bit sequence:

providing the individual bit of the first bit sequence as input to the Hadamard gate to obtain a first transformed bit;

providing the first transformed bit and one or more other bits of the first bit sequence as input to the first logic circuit to produce a first bit output, wherein the one or more other bits of the first bit sequences are determined based on an index of the individual bit of the first bit sequence, and wherein the second bit sequence includes the first bit output;

generate a seed sequence based on the second bit sequence; and use the seed sequence as a seed to the encryption engine.

2. The system of claim 1, wherein generating the seed sequence includes:

generating a third bit sequence by concatenating the first bit sequence and the second bit sequence;

generating a fourth bit sequence based on the third bit sequence by, for individual bits of the third bit sequence:

providing the individual bit of the third bit sequence as input to the Hadamard gate to obtain a second transformed bit;

providing the second transformed bit and one or more other bits of the third bit sequence as input to the first logic circuit to produce a second bit output, wherein the one or more other bits of the third bit sequence are determined based on an index of the individual bit of the third bit sequence, and wherein the fourth bit sequence includes the second bit output.

3. The system of claim 2, wherein the third bit sequence is generated by concatenating the first bit sequence with second bit sequence in forward or reverse bit order.

4. The system of claim 2, wherein generating the seed sequence further includes:

applying a logic XNOR operation between the third bit sequence and the fourth bit sequence to generate a fifth bit sequence;

generating a sixth bit sequence based on the third bit sequence by, for individual bits of the third bit sequence:

providing the individual bit of the third bit sequence and one or more other bits of the third bit sequence as input to the first logic circuit to produce a third bit output, wherein the one or more other bits of the third bit sequence are determined based on the index of the individual bit of the third bit sequence, and wherein the sixth bit sequence includes the third bit output.

5. The system of claim 4, wherein generating the seed sequence further includes:

applying a logic XNOR operation between the third bit sequence and the sixth bit sequence to generate a seventh bit sequence;

applying a logic XNOR operation between the fifth bit sequence and the seventh bit sequence to generate an eighth bit sequence.

6. The system of claim 5, wherein the seed sequence is derived from the eighth bit sequence.

7. The system of claim 6, wherein the seed sequence is the same length as the eighth bit sequence or half the length of the eighth bit sequence.

8. The system of claim 1, wherein the one or more other bits of the first bit sequence include a first bit and a second bit, wherein an index of the first bit is the length of the first bit sequence minus the index of the individual bit of the first bit sequence, and wherein an index of the second bit is the index of the individual bit of the first bit sequence plus one.

9. The system of claim 8, wherein the first logic circuit comprises a logic XNOR operation between the first transformed bit and the first bit to produce a first circuit output and a logic XNOR operation between the first transformed bit and the second bit to produce a second circuit output.

10. The system of claim 9, wherein the first logic circuit further comprises a logic XNOR operation between the first circuit output and the second circuit output to produce the first bit output.

11. A method for utilizing a Hadamard gate for generating seed sequences for an encryption engine, the method comprising:

storing a Hadamard gate and a first logic circuit, wherein the first logic circuit is configured to apply one or more logic operations on one or more inputs to the first logic circuit to produce bit outputs;

receiving a first bit sequence;

generating a second bit sequence based on the first bit sequence by, for individual bits of the first bit sequence:

providing the individual bit of the first bit sequence as input to the Hadamard gate to obtain a first transformed bit;

providing the first transformed bit and one or more other bits of the first bit sequence as input to the first logic circuit to produce a first bit output, wherein the one or more other bits of the first bit sequences are determined based on an index of the individual bit of the first bit sequence, and wherein the second bit sequence includes the first bit output;

generating a seed sequence based on the second bit sequence; and using the seed sequence as a seed to the encryption engine.

12. The method of claim 11, wherein generating the seed sequence includes:

generating a third bit sequence by concatenating the first bit sequence and the second bit sequence;

generating a fourth bit sequence based on the third bit sequence by, for individual bits of the third bit sequence:

providing the individual bit of the third bit sequence as input to the Hadamard gate to obtain a second transformed bit;

providing the second transformed bit and one or more other bits of the third bit sequence as input to the first logic circuit to produce a second bit output, wherein the one or more other bits of the third bit sequence are determined based on an index of the individual bit of the third bit sequence, and wherein the fourth bit sequence includes the second bit output.

13. The method of claim 12, wherein the third bit sequence is generated by concatenating the first sequence with the second bit sequence in forward or reverse bit order.

14. The method of claim 12, wherein generating the seed sequence further includes:

applying a logic XNOR operation between the third bit sequence and the fourth bit sequence to generate a fifth bit sequence;

generating a sixth bit sequence based on the third bit sequence by, for individual bits of the third bit sequence:

providing the individual bit of the third bit sequence and one or more other bits of the third bit sequence as input to the first logic circuit to produce a third bit output, wherein the one or more other bits of the third bit sequence are determined based on the index of the individual bit of the third bit sequence, and wherein the sixth bit sequence includes the third bit output.

15. The method of claim 14, wherein generating the seed sequence further includes:

applying a logic XNOR operation between the third bit sequence and the sixth bit sequence to generate a seventh bit sequence;

applying a logic XNOR operation between the fifth bit sequence and the seventh bit sequence to generate an eighth bit sequence.

16. The method of claim 15, wherein the seed sequence is derived from the eighth bit sequence.

17. The method of claim 16, wherein the seed sequence is the same length as the eighth bit sequence or half the length of the eighth bit sequence.

18. The method of claim 11, wherein the one or more other bits of the first bit sequence include a first bit and a second bit, wherein an index of the first bit is the length of the first bit sequence minus the index of the individual bit of the first bit sequence, and wherein an index of the second bit is the index of the individual bit of the first bit sequence plus one.

19. The method of claim 18, wherein the first logic circuit comprises a logic XNOR operation between the first transformed bit and the first bit to produce a first circuit output and a logic XNOR operation between the first transformed bit and the second bit to produce a second circuit output.

20. The method of claim 19, wherein the first logic circuit further comprises a logic XNOR operation between the first circuit output and the second circuit output to produce the first bit output.

* * * * *